United States Patent
Kimura et al.

(10) Patent No.: US 7,167,153 B2
(45) Date of Patent: Jan. 23, 2007

(54) SIGNAL PROCESSING CIRCUIT AND SIGNAL PROCESSING METHOD OF DIGITAL DISPLAY

(75) Inventors: Toru Kimura, Tokyo (JP); Goro Ueda, Tokyo (JP)

(73) Assignee: Pioneer Corporation, Tokyo (JP)

( * ) Notice: Subject to any disclaimer, the term of this patent is extended or adjusted under 35 U.S.C. 154(b) by 215 days.

(21) Appl. No.: 10/097,011

(22) Filed: Mar. 14, 2002

(65) Prior Publication Data
US 2002/0130974 A1 Sep. 19, 2002

(30) Foreign Application Priority Data
Mar. 16, 2001 (JP) ............................. 2001-077005

(51) Int. Cl.
*G09G 3/36* (2006.01)
(52) U.S. Cl. ...................................... 345/100; 345/204
(58) Field of Classification Search ................ 345/694, 345/698, 100, 98, 204
See application file for complete search history.

(56) References Cited

U.S. PATENT DOCUMENTS 6,088,062 A * 7/2000 Kanou et al. ............... 348/441
6,344,850 B1 * 2/2002 Okumura et al. ........... 345/204

* cited by examiner

Primary Examiner—Richard Hjerpe
Assistant Examiner—Kevin M. Nguyen
(74) Attorney, Agent, or Firm—Sughrue Mion, PLLC

(57) ABSTRACT

When power is turned on, dummy output information stored in a non-volatile memory is issued to the digital signal processing circuit. In a dummy data processing block, and in a line memory holding data in the horizontal direction, dummy data inputted from outside is inserted into a one-line video data processed at an input signal processing block, based on the dummy output information. In this way, the video data is revised into data that is appropriate for each display, based on the dummy output information. Then the one-line video data including the dummy data is inputted into the output signal processing block, and is latched by the output signal processing block, and outputted to each of the data drivers as a data driver output signal, at the same time.

10 Claims, 5 Drawing Sheets

SIGNAL PROCESSING CIRCUIT AND SIGNAL PROCESSING METHOD OF DIGITAL DISPLAY

BACKGROUND OF THE INVENTION

1. Field of the Invention

The present invention relates to a signal processing circuit and a signal processing method of a digital display, which is used in liquid crystal displays and plasma displays and so on, and particularly relates to a signal processing circuit and a signal processing method of a digital display that attempts an improvement of the general versatility of the signal processing circuit.

2. Description of the Related Art

Corresponding to the digitization of broadcasting and data communication, an image display in digital displays are conducted by video signals with an aspect ratio of 4:3, and whose number of pixels in the transverse and longitudinal (horizontal and vertical) directions are 640 by 480, 800 by 600, or 1024 by 768. The image display in digital displays are also conducted by video signals with an aspect ratio of 16:9, and whose number of pixels in the transverse and longitudinal directions are 854 by 480, 1280 by 720, 1366 by 768, or 1920 by 1080. The image display in digital displays are also conducted by digital video signals that are used for general purpose in personal computers, with the number of pixels in the transverse and longitudinal directions being 1280 by 1024.

In digital display panels, such as liquid crystal display (LCD) panels and plasma display panels (PDP) for example, the displaying picture element is classified according to usage, such as VGA (640 by 480 pixels), wide VGA (854 by 480 pixels), XGA (1024 by 768 pixels), or wide XGA (1366 by 768 pixels). For driver integrated circuits (driver IC) that drive the digital display, those with output bits of $2^n$ (n is a natural number), or 1.5 times $2^n$, which are numbers easy to process digitally, are used.

A driving method to display one horizontal line of video data on a wide VGA panel will be described next. Data for one horizontal line is usually transferred to the display panel using data driver IC's (called "data driver" hereinafter). One horizontal line of the wide VGA panel is composed of 854 pixels, and one pixel is composed of three picture elements, i.e., red, green, and blue elements (RGB), hence data is transferred to 2562 picture elements simultaneously. One picture element of the panel is driven by one output bit of the data driver. Therefore, 41 data drivers are needed when using a sixty-four-bit output data driver, for example. That is because a value of 40.03125 is obtained when dividing the total number of picture elements 2562 by the number of output bits 64, and 41 data drivers are needed to drive a wide VGA panel, because it is not possible to drive all of the picture elements with 40 data drivers. Since 41 data drivers for sixty-four-bit output can drive 2624 picture elements, there are 62 bits (=2624−2562) of data driver outputs that are not connected to the panel, when driving a wide VGA panel with 41 data drivers for sixty-four-bit output. These driver outputs will be called "dummy outputs" hereinafter.

FIG. 1A is a schematic view showing the relation of a panel and a dummy output, and FIG. 1B is an enlarged view of FIG. 1A. A plurality of data drivers 51 are divided into a plurality of groups with three data drivers each, for example, and a tape carrier package (TCP) 52 is allocated to each of the groups. A plurality of bits are outputted from each of the data drivers 51, and some of those bits are made to be dummy outputs 53 that does not get to be connected to panel electrodes. The location of the arrangement of the dummy outputs 53 is usually determined by the arranged relation between the data driver outputs and extracting electrodes of the panel 54, such as the extracting portions of the data electrodes for example. For each of the data drivers 51, display data is inputted from a signal processing circuit 55 into each of the TCPs 52, and the display data is shifted sequentially within the single TCP 52.

In conventional digital displays, dummy output bits are defined for every combination of panel constitution and data driver constitution, and dummy output terminals (called "dummy bits" hereinafter) are allocated at the line memory (not shown) provided inside the signal processing circuit 55, when conducting a digital signal processing for image display.

However, the data driver constitution and the panel constitution, and the picture element pitch in particular, differs between a 42-inch screen display and a 50-inch screen display, even when they are both digital displays displaying the same wide VGA. On account of this, the connections between the data drivers and the panel electrodes are not determined uniquely just because they are wide VGA, and there is a problem in that each of the displays needs to have different dummy bits.

The number of picture elements differ between a wide XGA display and a wide VGA display, even when they are both the same 42-inch screen display, and the number of data driver outputs needed for the wide XGA display is more than those needed for the wide VGA. The dummy bits also differ in such a case. Therefore, there is also a problem in that it is necessary to change the constitution of the circuit conducting the digital signal processing corresponding to the size of the display and the number of picture elements, and also necessary to prepare a signal processing circuit for each model of the display.

These problems are in regard to the relation between the number of picture elements of the digital display in the transverse direction, and the data drivers. But similar dummy bits exist in a relation between the number of picture elements in the longitudinal direction, and the driver ICs for driving in the longitudinal direction, such as scanning driver ICs (scanning driver) or sustain driver ICs (sustain driver) in plasma displays for example, and similar problems are present in these cases also.

Therefore, an exclusive signal processing circuit is needed for each combination of display panel constitution and driver IC constitution. For example, when developing a digital display with a wide variety of products, an exclusive signal processing circuit is needed for each product, and a great amount of development cost and developing man-hours are needed to fulfill this. When either one of the display panel or the driver IC is already developed, and the other one is going to be developed new and combined with the former, there will be a need to develop a large scale integrated circuit (LSI) for the signal processing circuit to realize this new combination, and a great amount of development cost and developing man-hours are needed to fulfill this.

SUMMARY OF THE INVENTION

An object of the present invention is to provide a signal processing circuit and a signal processing method of a digital display that can be used for general purposes, even when a combination of the display panel constitution and the driver IC constitution is not a proper combination.

A signal processing circuit of a digital display according to the present invention is a signal processing circuit for transforming an inputted video signal into a signal for a driver that drives the digital display panel. This signal processing circuit has a plurality of output terminals, and a dummy data inserting-circuit that inserts dummy data, which is outputted to the dummy output terminal, into the video signal based on dummy output information made corresponding to a location of the dummy output terminal among these output terminals, which is not connected to an electrode of the aforementioned digital display panel.

A signal processing method of a digital display according to the invention is a signal processing method for transforming an inputted video signal into a signal for a driver that drives the digital display panel. This signal processing method includes the steps of making dummy output information corresponding to a location of a dummy output terminal among a plurality of output terminals, which is not connected to an electrode of the aforementioned digital display panel, and inserting dummy data, which is outputted to the dummy output terminal, into the video signal, based on this dummy output information that has been made.

In this invention, dummy data is outputted to the dummy output terminals as appropriate based on the dummy output information made for each of the digital displays. However, since the dummy data is not connected to the electrodes of the digital display panel, the dummy data is not displayed, and a normal display can be achieved. Therefore, there is no need to change the signal processing circuit in response to a change in size or resolution of the digital display, and there is only a need to rewrite the dummy output information for each of the displays. Hence, signal processing circuits provided with the same circuit construction can be shared among a plurality of types of digital displays with different sizes and resolutions, and also it is possible to adapt to various combinations of display panel constitutions and data driver constitutions. For example, in a combination of the aforementioned wide VGA panel and a sixty-four-bit output data driver, controlling of the writing of video signal and dummy data onto the line memory is done, by preparing 62 bits of dummy data in a line memory within the signal processing data path as redundant bits, and transferring dummy output information from outside the signal processing circuit.

The aforementioned dummy output information can be stored in an external storage apparatus, such as non-volatile memory. The aforementioned dummy data can be included in the aforementioned dummy output information. The aforementioned dummy data can also be inserted for each line of video signal.

BRIEF DESCRIPTION OF THE DRAWINGS

FIG. 3A is a schematic view indicating the number of dummy bits in a 42-inch display, and FIG. 3B is a schematic view indicating the number of dummy bits in a 50-inch display;

FIG. 5A is a block diagram showing the signal processing system for a 50-inch wide XGA panel, and FIG. 5B is a block diagram showing the signal processing system for a 42-inch wide VGA display.

DETAILED DESCRIPTION OF THE PREFERRED EMBODIMENT

Figure 1A:
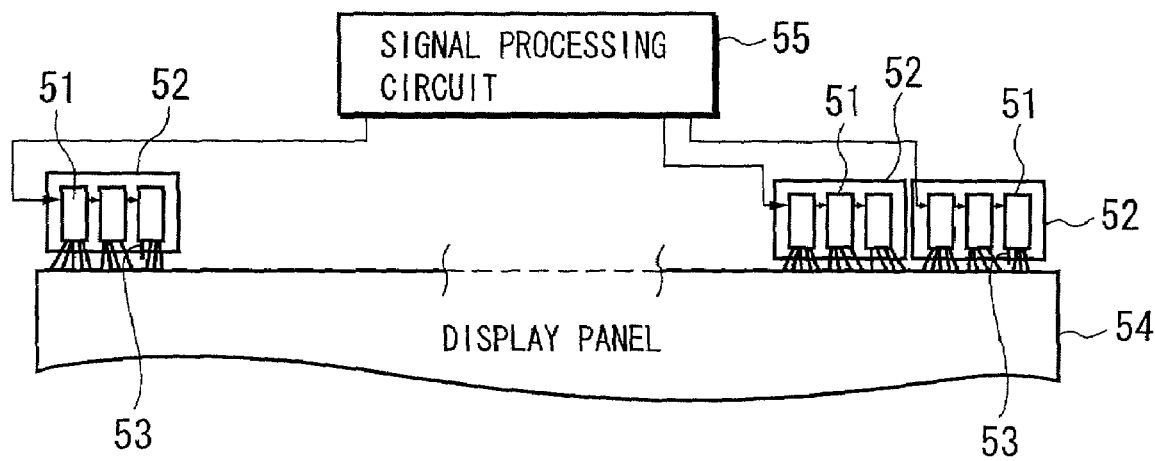
FIG. 1A is a schematic view showing the relation of a panel and a dummy output.
Figure 1B:
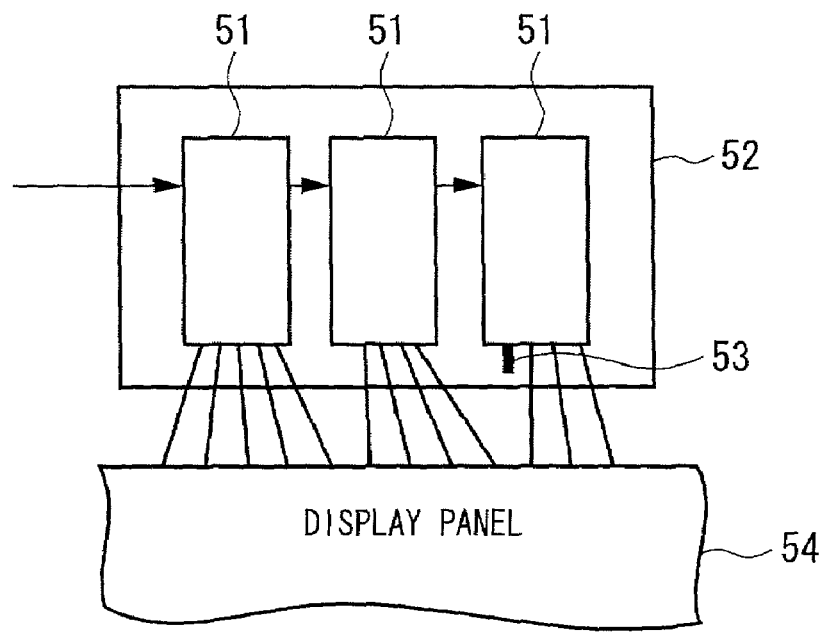
FIG. 1B is an enlarged view of FIG. 1A.
Figure 2:
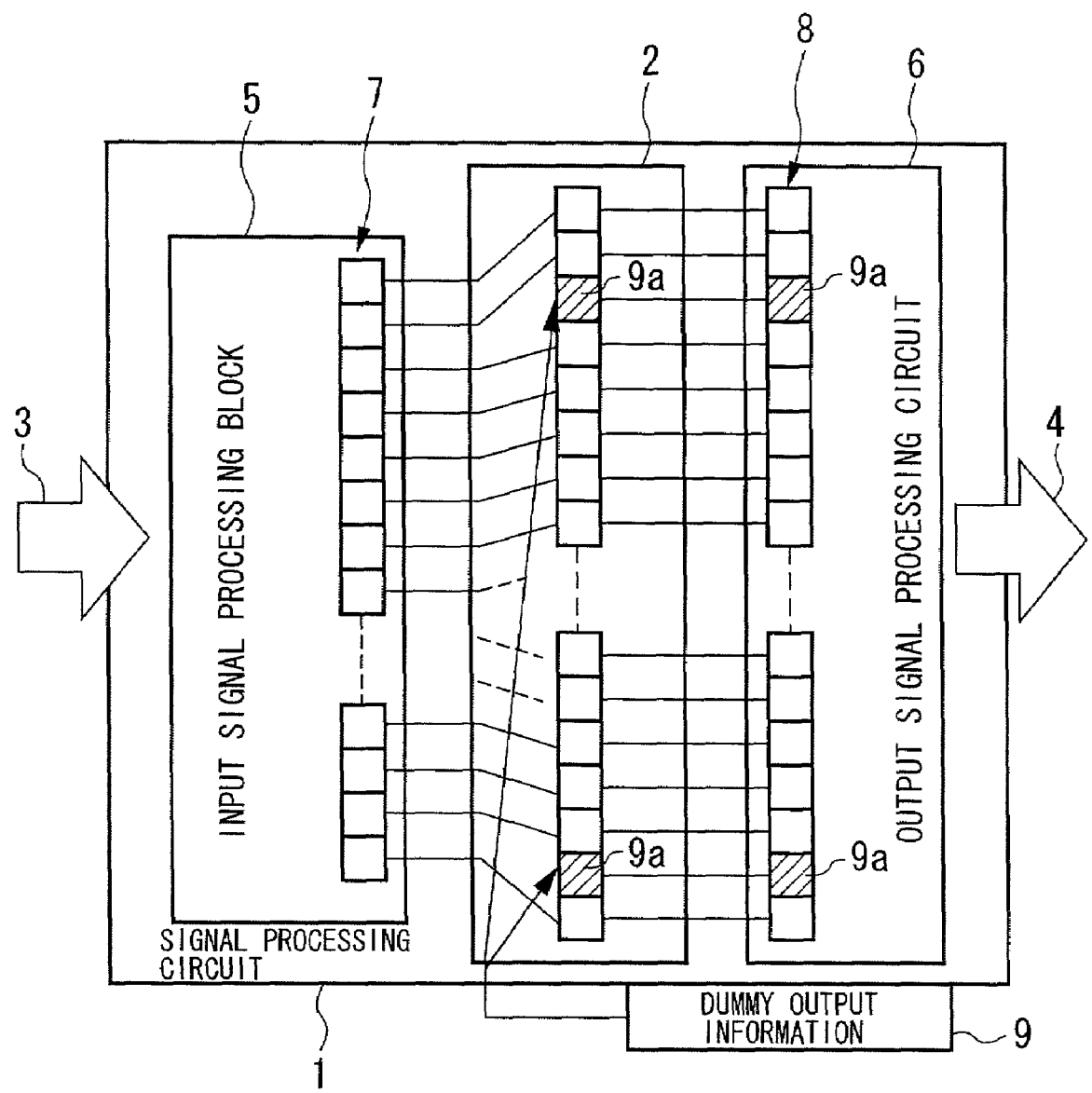
FIG. 2 is a block diagram showing the constitution of a signal processing circuit according to an embodiment of this invention.

Hereinafter, a signal processing circuit of a digital display according to an embodiment of the invention will be described specifically with reference to the attached drawings. FIG. 2 is a block diagram showing the constitution of the signal processing circuit according to the embodiment of this invention.

In the digital signal processing circuit 1 according to this embodiment, an input signal processing block 5, a dummy data processing block 2, and an output signal processing block 6 are connected sequentially on the data path starting from the input side. A video signal 3 is inputted into the input signal processing block 5. Dummy output information 9 stored in an external non-volatile memory such as a read only memory (ROM), and output data from the input signal processing block 5 are inputted into the dummy data processing block 2. An output signal of the dummy data processing block 2 is inputted into the output signal processing block 6, and a data driver output signal 4 is outputted from the output signal processing block 6 into the data driver. A plurality of output terminals are provided on the data drivers for outputting a plurality of bits, such as 96 bits for example, and some of them are made to be dummy output terminals (dummy bits) and are not connected to the panel electrodes, based on the relation of the total number of output bits to the number of panel electrodes, as mentioned above. The dummy output information 9 is determined by the connecting relation between the output terminals of the data driver and the input terminals of the display panel, for example, and includes information about which data driver output is made a dummy output, in other words, where to insert the dummy data (redundant bit). The dummy data is provided with the same number of bits as ordinary displaying data, which is similar to conventional methods, and cannot be distinguished from ordinary displaying data just by appearance, but its form is not particularly limited.

In a digital signal processing circuit 1 constituted in this way, dummy output information 9 stored in the non-volatile memory is issued to the digital signal processing circuit 1, when the power is turned on. When a video signal 3 is inputted into the input signal processing block 5, video data 7 for one line is latched at the input signal processing block 5, and outputted at the same time. In the dummy data processing block 2, and in a line memory holding data in the horizontal direction, the dummy data 9a (redundant bits) inputted from outside is inserted into the video data 7 for one line processed at the input signal processing block 5, based on the dummy output information 9. In FIG. 2, the dummy bits 9a are drawn in hatchings. In this way, the video data 7 is revised to data that is appropriate for each of the displays, based on the dummy output information 9. The video data 8 for one line including the dummy data 9a is inputted into the output signal processing block 6 next, and is latched by the output signal processing block 6, and outputted simultaneously to each of the data drivers as a data driver output signal 4. In this case, the dummy data 9a and the display data are not particularly distinguishable with each other, and the dummy data 9a is outputted to the data driver in the same form as the display data. However, since the output terminal of the data driver that has had the dummy data 9a inputted is not connected to the panel electrode, an image of the dummy data 9a is not displayed on the display panel, and only an image of the display data, which is the normal image, is displayed.

In this way, the difference in the number of output bits of the data drivers for each of the display panels, and the difference between the panel electrodes for each of the display panels, are absorbed within the signal processing circuit 1, according to the present embodiment. Therefore, it is possible to conduct an appropriate image input and image display, even when using signal processing circuits 1 with the same construction in digital displays of different display size. This applies not only to different display size, but also to different resolutions, and also applies to cases in which both the display size and resolution are different.

Figure 3A:
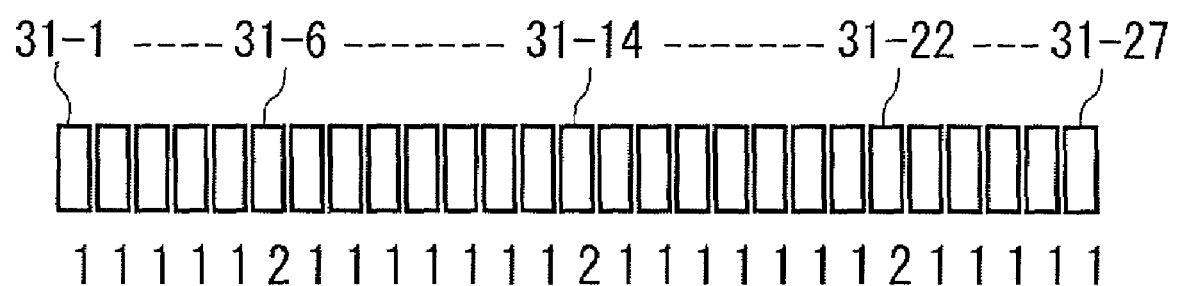
FIGS. 3A and 3B include drawings indicating the number of dummy bits for each of the data drivers, where
Figure 3B:
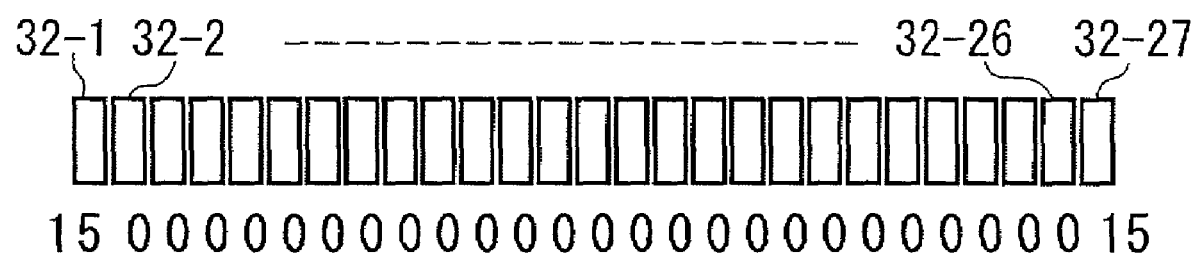

A 42-inch display and a 50-inch display provided with such signal processing circuits 1 will be described next. FIGS. 3A and 3B include drawings indicating the number of dummy bits for each of the data drivers, in which FIG. 3A is a schematic view indicating the number of dummy bits in a 42-inch display, and FIG. 3B is a schematic view indicating the number of dummy bits in a 50-inch display. The signal processing circuit 1 can be used in both of the displays, without changing their circuit construction. The resolutions of these displays are configured to be 854 by 480 pixels (wide VGA), for example. The output of each of the data drivers in both of the displays are configured to be 96 bits, for example. Therefore, 27 data drivers and 30 dummy bits are needed in both of the displays.

However, since the size of the picture element of the 42-inch display is 0.84 times the picture element of the 50-inch display, the pitch between the signal lines connecting the data drivers 31-1 through 31-27 to the panel electrodes in the 42-inch display, is small compared to the pitch of the 50-inch display. Work efficiency and workability in a connecting process decline when manufacturing with a small connecting pitch, and as a result, the manufacturing yield of the display deteriorates. Therefore, in the 42-inch display that has a fine picture element pitch, dummy bits are configured for each data driver, in order to secure a connecting pitch as wide as possible for each of the data drivers. Specifically, two dummy bits are configured for each of the data drivers 31-6, 31-14, and 31-22, while configuring one dummy bit each for the other data drivers, for example, as shown in FIG. 3A.

On the other hand, since the picture element pitch of the 50-inch display is comparatively coarse, the effect of the pitch between the signal lines connecting the data drivers 32-1 through 32-27 to the panel electrodes, to the manufacturing yield is small enough to be ignored. Therefore, there is no need to disperse the dummy bits like in the 42-inch displays. As a result, generation of connection error can be restrained by configuring dummy bits for the first data driver and the last data driver of the horizontal line, for example, which leads to an improvement in manufacturing yield. Specifically, 15 dummy bits are configured only for the data drivers 32-1 and 32-27, while no dummy bit is configured for the other data drivers, for example, as shown in FIG. 3B.

Figure 4A:
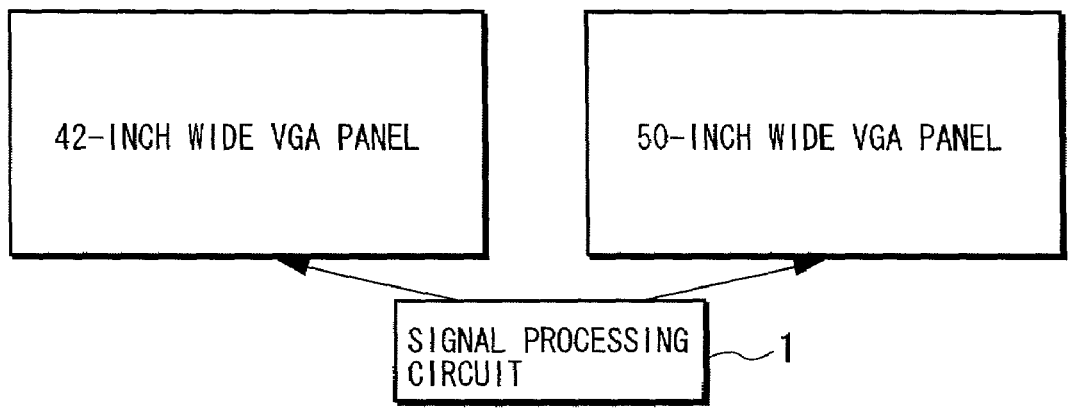
FIG. 4A is a schematic view showing the relation of the signal processing circuit 1 according to the embodiment of this invention, and a 42-inch display and a 50-inch display.
Figure 4B:
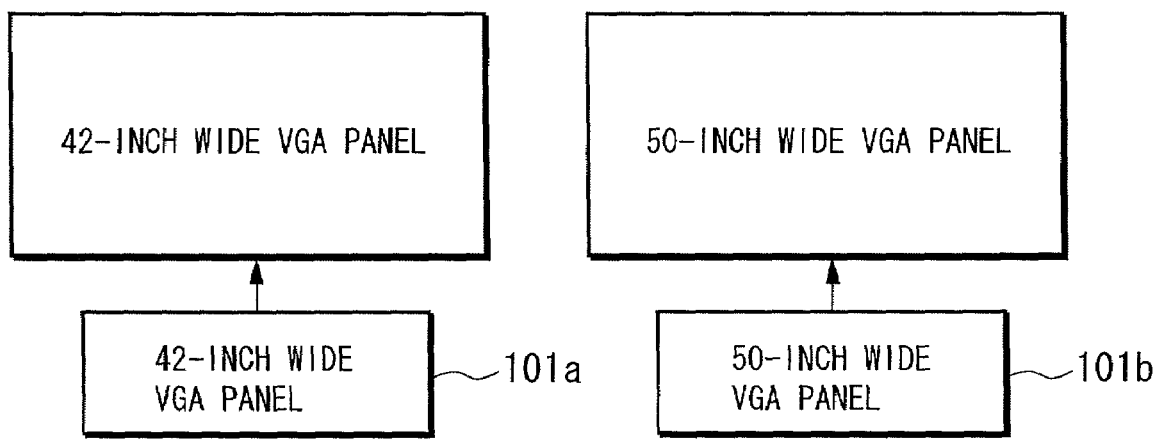
FIG. 4B is a schematic view showing the relation of a conventional signal processing circuit, and the 42-inch display and the 50-inch display.

FIG. 4A is a schematic view showing the relation of the signal processing circuit 1 according to the embodiment of this invention, and the 42-inch display and the 50-inch display. FIG. 4B is a schematic view showing the relation of a conventional signal processing circuit, and the 42-inch display and the 50-inch display. When a display is constituted by connecting the signal processing circuit 1 and a display panel, it is possible to use a plurality of displays with different sizes, such as using either the 42-inch wide VGA panel or the 50-inch wide VGA panel, for example, so long as dummy output information configured for each of the displays are prepared, as shown in FIG. 4A. On the other hand, when a display is constituted by connecting a conventional signal processing circuit and a display panel, it is necessary to design and prepare exclusive signal processing circuits with different constitutions for each of the displays with different sizes, even when their resolutions are the same. For example, a signal processing circuit 101a made exclusively for a 42-inch display is necessary for the 42-inch wide VGA panel, and a signal processing circuit 101b made exclusively for a 50-inch display is necessary for the 50-inch wide VGA panel.

Figure 5A:
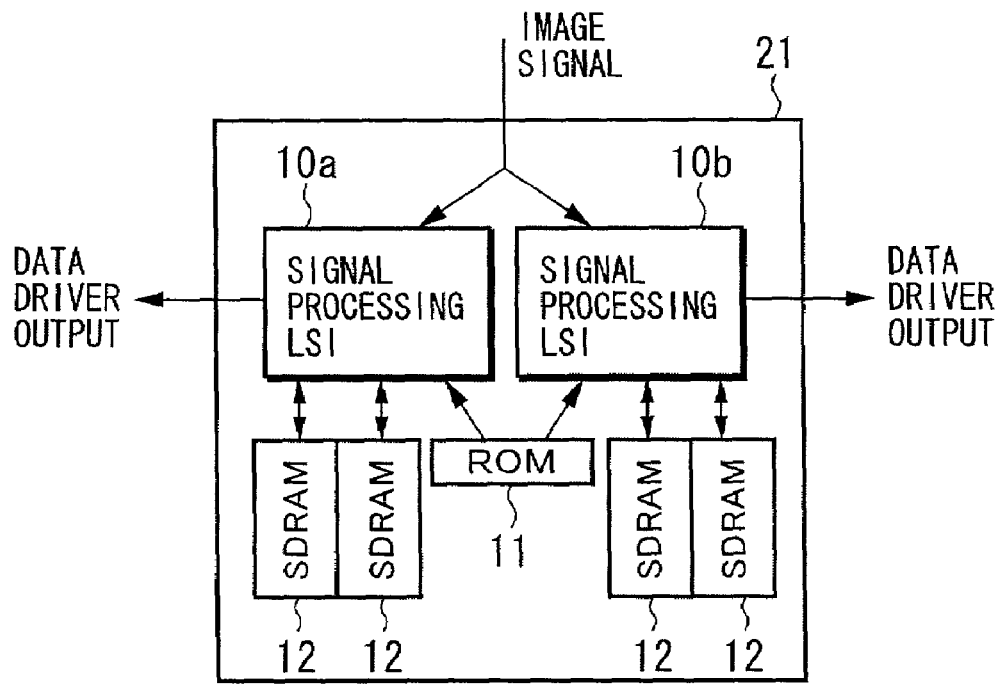
FIGS. 5A and 5B include drawings showing a signal processing system of a digital display, where
Figure 5B:
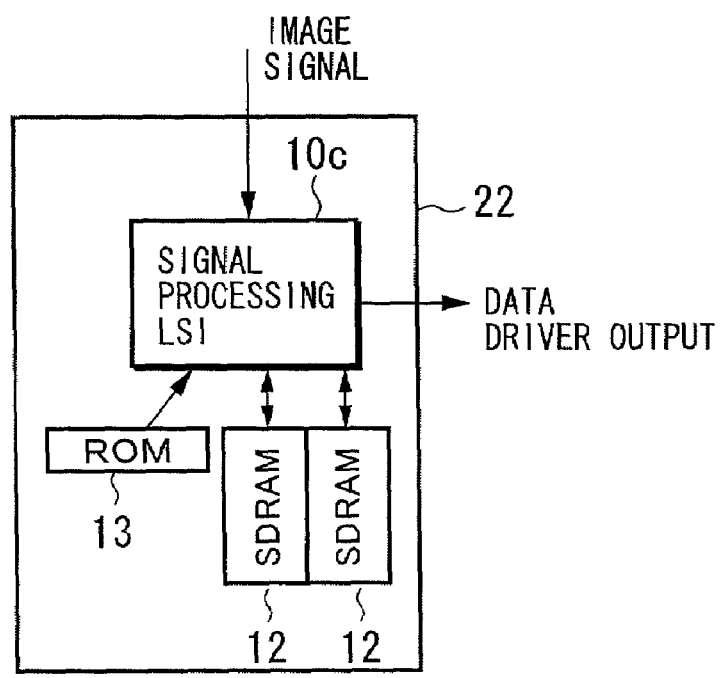

A signal processing system of a digital display provided with the signal processing circuit 1, such as a plasma display for example, will be described next. FIGS. 5A and 5B include drawings showing the signal processing system of the digital display, and FIG. 5A is a block diagram showing the signal processing system for a 50-inch display, and FIG. 5B is a block diagram showing the signal processing system for a 42-inch display. The signal processing circuit 1 can be used in both of the signal processing systems, without changing their circuit construction. The signal processing LSIs 10a and 10b contain the signal processing circuit 1 in the signal processing system 21 for the 50-inch wide VGA panels, and the signal processing LSI 10c contains the signal processing circuit 1 in the signal processing system 22 for the 42-inch wide VGA panels. The signal processing LSI 10a outputs video data to the data drivers driving 683 lines provided on the right half portion of the wide XGA screen, and the signal processing LSI 10b outputs video data to the data drivers driving 683 lines provided on the left half portion of the wide XGA screen. The signal processing LSI 10c outputs video data to the data drivers driving 854 lines provided on the wide VGA screen. However, the signal processing LSIs 10a, 10b, and 10c are provided with the same circuit constitution.

A non-volatile memory that stores dummy output information, such as ROM 11 for example, is provided in the signal processing system 21. The dummy output information is made based on the relation between the panel electrodes of the 50-inch wide XGA display panel, and the dummy outputs of the data drivers. A non-volatile memory that stores dummy output information, such as ROM 13 for example, is provided in the signal processing system 22. The dummy output information is made based on the relation between the panel electrodes of the 42-inch wide VGA display panel, and the dummy outputs of the data drivers. An appropriate amount of synchronous dynamic random access memory (SDRAM) 12 is provided in both of the signal processing systems 21 and 22, as frame buffer memory for changing the arrangement of the video signal in the time and space axis, the amount of memory corresponding to the storage capacity of the frame buffer and the amount of data to be processed.

In the signal processing systems 21 and 22 constituted in such a way, dummy output information is issued from the ROM 11 or ROM 13 to the signal processing LSI's 10a, 10b, and 10c, and dummy data is inserted into prescribed locations of the display data at the dummy data processing blocks inside each of the signal processing LSIs 10a, 10b, and 10c, when the power of the plasma display module is turned on. The display data is inputted into data lines (data electrodes) through the panel electrodes, as mentioned above, and a normal image without dummy data is displayed, because the dummy data is inputted into data drivers whose output terminals are not connected to the panel electrodes.

In this way, the signal processing LSIs of the same construction 10a, 10b, and 10c can be used to correspond to both a 42-inch wide VGA plasma display module, and a 50-inch wide XGA plasma display module, which differ in the connected relation of the data drivers and the panel electrodes.

Even with digital displays having different connecting relations between the data drivers and the panel electrodes in the right half portion, and the left half portion of the screen, signal processing LSIs having the same construction, which also contain the signal processing circuit according to this invention, can be used for both of the half portions, by making dummy output information, which is stored into the non-volatile memory, based on each of the connecting relations. Therefore, it becomes possible to adapt signal processing LSIs of the same construction to digital displays having different numbers of displaying picture elements, and a low cost digital display can be realized in a short period of time.

In the above-mentioned embodiment, a data driver was made the subject for the driver IC, but similar effects can be achieved in scanning drivers or sustain drivers, or the like.

With this invention, as described above in detail, there is no need to change the signal processing circuit in response to a change in size or resolution of the digital display, and there is only a need to rewrite the dummy output information for each of the displays. Therefore, signal processing circuits provided with the same circuit construction can be shared among a plurality of types of digital displays with different sizes and resolutions. It is also possible to adapt to various combinations of display panel constitutions and data driver constitutions. As a result, it is possible to realize a substantial reduction in developing man-hours, and cost.

What is claimed is:

1. A signal processing circuit for a data driver of a digital display, comprising:
    an input signal processing block which receives an input video signal and outputs a line video data corresponding to a line of said input video signal;
    a dummy information memory for keeping therein dummy information representing a location of at least one dummy output terminal of said data driver;
    a dummy data processing block which
    receives said line video data, output from said input signal processing block, and said dummy information,
    inserts dummy data into said line video data to create combined data based on said dummy information, and
    outputs the combined data; and
    an output signal processing block which receives said combined data, output from said dummy data processing block, and outputs said combined data through a plurality of output terminals of the output signal processing block as a signal for the data driver driving the digital display;
    wherein a location of the dummy data in the combined data corresponds to a location of a dummy output terminal which is not connected to an electrode of the digital display, among a plurality of output terminals of the data driver; and
    wherein the combined data output from the dummy data processing block remains unchanged until the combined data is supplied to the data driver.

2. The signal processing circuit of a digital display according to claim 1, wherein said dummy information is stored in an external storage apparatus and output therefrom to said dummy data processing block.

3. The signal processing circuit of a digital display according to claim 1, wherein said dummy information received by said dummy data processing block includes said dummy data.

4. The signal processing circuit of a digital display according to claim 2, wherein said dummy information output by said external storage apparatus includes said dummy data.

5. The signal processing circuit of a digital display according to claim 1, wherein
    said video data output by said input signal processing block comprises a plurality of one-line video signals, and
    said dummy data is inserted into each of said one-line video signals.

6. A signal processing method of a digital display for transforming an inputted line video signal into a signal for a data driver driving a digital display panel, comprising:
    preparing dummy information representing a location of at least one dummy output terminal of said data driver;
    receiving said inputted line video signal and said dummy information;
    inserting dummy data into said inputted line video signal to create combined data based on said dummy information;
    outputting said combined data as a signal for the data driver driving the digital display;
    wherein a location of the dummy data in the combined data corresponds to a location of a dummy output terminal which is not connected to an electrode of the digital display, among a plurality of output terminals of the data driver; and
    wherein the combined data, after inserting the dummy data into the inputted video signal, remains unchanged until the combined data is supplied to the data driver.

7. The signal processing method of a digital display according to claim 6, wherein said dummy information is stored in an external storage apparatus.

8. The signal processing method of a digital display according to claim 6, wherein said dummy information includes said dummy data.

9. The signal processing method of a digital display according to claim 7, wherein said dummy information includes said dummy data.

10. The signal processing method of a digital display according to claim 6, wherein
    said video signal comprises a plurality of one-line video signals, and
    said dummy data is inserted into each of said one-line video signals.

* * * * *